(No Model.)
H. A. TINKHAM.
LOCK JOINT PIPE AND COLLAR COUPLING FOR STOVES OR FURNACES.
No. 590,938. Patented Sept. 28, 1897.
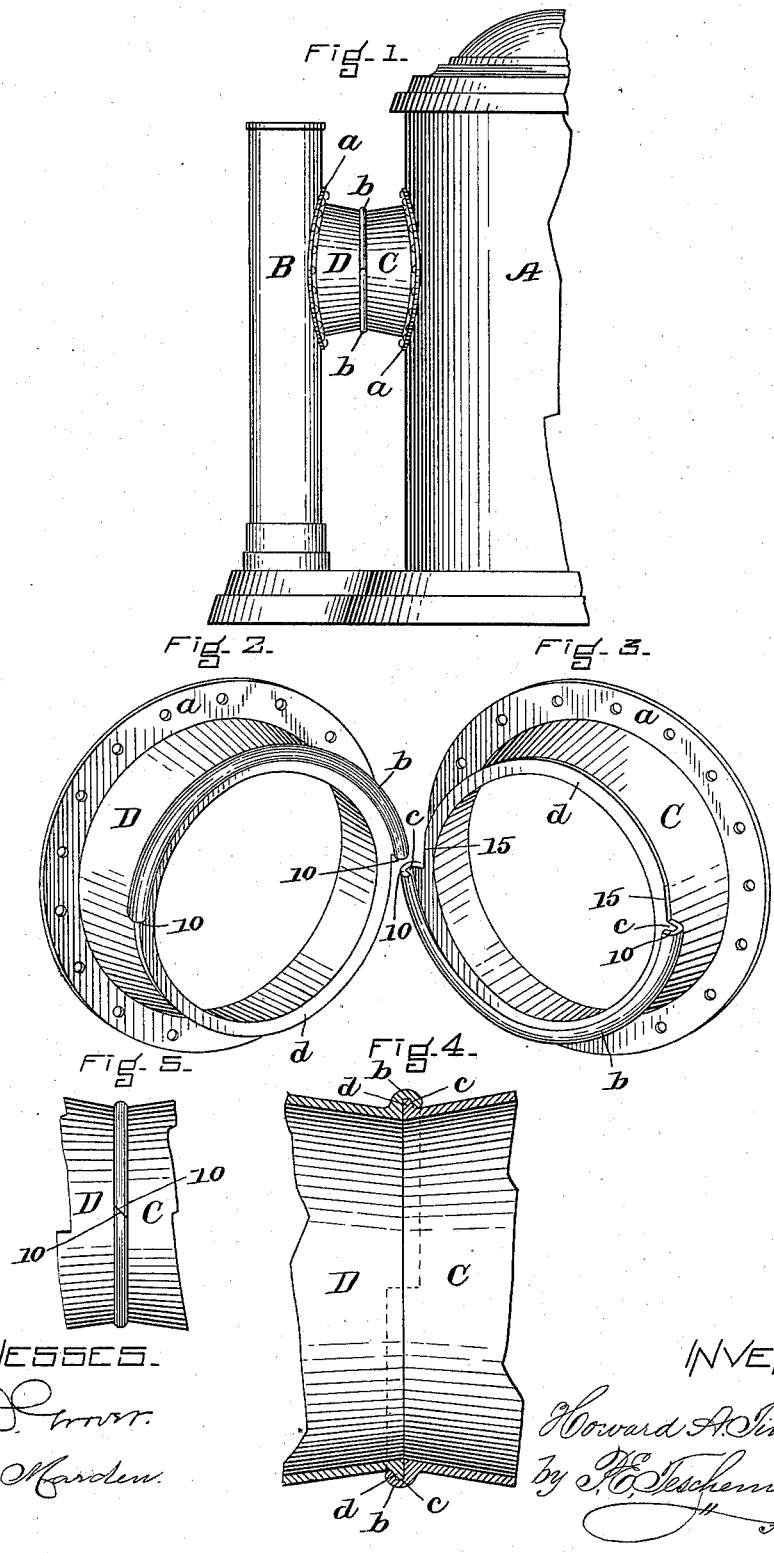
WITNESSES.
INVENTOR.
Howard A. Tinkham

UNITED STATES PATENT OFFICE.

HOWARD A. TINKHAM, OF NORTON, MASSACHUSETTS.

LOCK-JOINT PIPE AND COLLAR COUPLING FOR STOVES OR FURNACES.

SPECIFICATION forming part of Letters Patent No. 590,938, dated September 28, 1897.

Application filed January 15, 1897. Serial No. 619,341. (No model.)

*To all whom it may concern:*

Be it known that I, HOWARD A. TINKHAM, a citizen of the United States, residing at Norton, in the county of Bristol and State of Massachusetts, have invented an Improved Lock-Joint Pipe and Collar Coupling for Stoves, Furnaces, Gas and Water Pipes, and other Purposes, of which the following is a full, clear, and exact description, reference being had to the accompanying drawings, making part of this specification, in which—

Figure 1 is a side elevation of a portion of a stove having my improved coupling applied thereto. Figs. 2 and 3 are perspective views of the two members or halves of the coupling. Fig. 4 is a vertical section of the coupling, showing the two parts or members locked together. Fig. 5 is a detail illustrating a modification.

My invention has for its object to provide a simple and effective interlocking pipe and collar coupling for stoves, furnaces, steam and water heaters, gas and water pipes, and other purposes which can be quickly and tightly put together without rivets or other fastenings; and to this end my invention consists in a coupling composed of two tubular members the opposing ends of which are each provided with an inwardly-grooved overhanging flange extending half-way around its periphery, the other half of said periphery having a semicircular lip or tongue which engages the semicircular groove of the overhanging flange of the opposing member when said members are put together, the lip $d$ of one member being cut away at its outer edge adjacent to the shoulders 10 to reduce its width and permit the shoulders 10 of both members to closely abut, the joint thus formed being rendered gas or water tight, if desired, by means of suitable cement or packing, as hereinafter set forth.

In the said drawings, A B represent two portions of a stove connected together by means of my improved coupling, which is composed of two tubular members C D, having their meeting or abutting edges interlocked, as shown in Figs. 1 and 4. Each of the members C D is provided with a flange $a$ or other suitable means for securing it to the adjacent portion of the stove or other object to which it is to be attached. The opposing or abutting ends of said members C D are each provided with a semicircular overhanging flange $b$, having on its inner surface a groove $c$, said grooved flange extending half-way around the periphery of the end of the member, as shown in Figs. 2 and 3. The other half of said periphery is provided with a semicircular lip or tongue $d$, which engages the groove $c$ of the overhanging flange $b$ of the opposing member when the two members are put together by a sliding movement of one upon the other, the shoulders 10, formed by the ends of the flanges $b$, abutting closely against each other when the parts are fitted together, and each lip $d$ entering the opposite groove $c$, whereby the parts are caused to interlock and be tightly secured together. The lip or tongue $d$ of the member C of the coupling is cut away at its outer edge to reduce its width, as at 15, at each of the shoulders 10, formed by the ends of its flange $b$, which permits the abutting ends of the flanges $b$ of the two members to fit closely together, as required. If preferred, the two shoulders may also be beveled, as shown in Fig. 5, to make a closer and stronger joint.

If it is desired to render the above-described joint perfectly gas or water tight, the grooves $c$ are filled with a suitable cement or packing before the two members of the coupling are put together.

The above-described interlocked coupling is simple, easily and quickly put together, especially in locations difficult of access, and may be used for a great variety of purposes—such as joints for stoves, furnaces, steam and water heaters, and for steam, water, and gas pipes, or wherever a packed gas or water tight joint is required.

What I claim as my invention, and desire to secure by Letters Patent, is—

The herein-described interlocking coupling, comprising two tubular members, the adjacent or abutting ends of which are each provided with an inwardly-grooved overhanging flange extending half-way around its periphery, the other half of said periphery having a semicircular lip or tongue for engaging the semicircular groove of the overhanging flange of the opposing member when said members are put together by a sliding movement of one upon the other, the lip or tongue of one member being cut away on its outer edge, as shown at 15, 15, to reduce its width adjacent to the shoulders 10 and thus permit the shoulders formed by the ends of the grooved flanges of the two members to lie flush or nearly so with each other, substantially as described.

Witness my hand this 12th day of January, A. D. 1897.

HOWARD A. TINKHAM.

In presence of—
P. E. TESCHEMACHER,
B. L. MARDEN.